Figure 1:
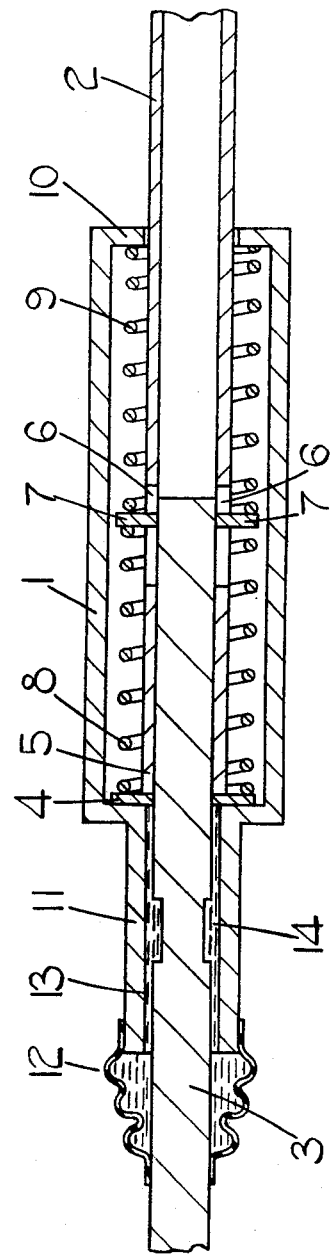

United States Patent [19]
Martin

[11] 3,957,260
[45] May 18, 1976

[54] DEVICE FOR CHANGING THE AMOUNT OF LINEAR MOVEMENT IN A LINKAGE

[75] Inventor: Frederick Raymond Patrick Martin, Bromley, England

[73] Assignee: The Lucas Electrical Company Limited, Birmingham, England

[22] Filed: Apr. 5, 1974

[21] Appl. No.: 458,401

[30] Foreign Application Priority Data
Apr. 6, 1973 United Kingdom............... 16524/73

[52] U.S. Cl.................................. 267/174; 267/69
[51] Int. Cl.[2]........................................ F16F 1/06
[58] Field of Search .................. 267/69, 70, 71, 72, 267/34, 174, 128

[56] References Cited
UNITED STATES PATENTS

| | | | |
|---|---|---|---|
| 2,851,904 | 9/1958 | Banek | 267/70 |
| 3,008,746 | 11/1961 | Senger | 267/128 |
| 3,131,921 | 5/1964 | Karbowniczek | 267/128 |
| 3,682,462 | 8/1972 | Papousek | 267/34 |

*Primary Examiner*—James B. Marbert
*Attorney, Agent, or Firm*—Haseltine, Lake & Waters

[57] ABSTRACT

A device for changing the amount of linear movement in a linkage system, preferably for reducing the movement, consists of a hollow body into opposite ends of which a tube and a co-axial rod extend. Attached to the inner end of the rod is a pair of flanges which extend through slots in the tube. A compression spring is lodged in the body between the flanges and an end of the body and a further compression spring is lodged between the flanges and an abutment on the tube at the opposite end of the body. Preferably, the rod passes with clearance through a sleeve forming an extension of the body and a viscous material is provided in the sleeve around the rod to act as a damper to short term movements of the rod.

11 Claims, 2 Drawing Figures

DEVICE FOR CHANGING THE AMOUNT OF LINEAR MOVEMENT IN A LINKAGE

This invention relates to a device for changing the amount of linear movement in a linkage system and more particularly though not exclusively, to a movement attenuator device for reducing the amount of linear movement.

The invention is particularly, though not exclusively, concerned with a movement attenuator device which is for use in a vehicle headlamp levelling system as described in our copending British patent application No. 16493/73 dated 6th Apr., 1973 and entitled "Headlamp Adjustment Devices On Motor Vehicles".

According to the present invention, there is provided a device for changing the amount of linear movement in a linkage system, comprising a slidable first element, a slidable second element, a fixed part relative to which the first and second elements are slidable, a first resilient member through which the second element is operably connected to the first element, and a second resilient member disposed between the second element and the fixed part and arranged to act in opposition to the first resilient member.

Preferably, the first element provides an input and the second element provides an output.

Preferably, the first and second elements are co-axially disposed.

The fixed part is conveniently formed on a body which houses adjacent ends of said elements.

Conveniently also, the first element has a tubular end portion into which extends the adjacent end portion of the second element, the first element being provided with slot means at an intermediate location and having an abutment projecting laterally from the tubular end portion, the first element having an abutment extending through the slot means, and the first resilient member extending between said two abutments and engaging thereagainst.

Preferably, each resilient member comprises a compression spring.

Preferably also, a damper unit is associated with one of said elements.

Most advantageously, the second element passes with a clearance through a sleeve and a viscous material is provided in the clearance between the second element and the sleeve, said material being arranged to oppose sudden relative movement between the sleeve and the second element but to permit slow relative movement therebetween.

Advantageously, a reservoir for the viscous material is provided internally of the sleeve.

Preferably, the sleeve is formed in the body or by part of the body.

Figure 2:
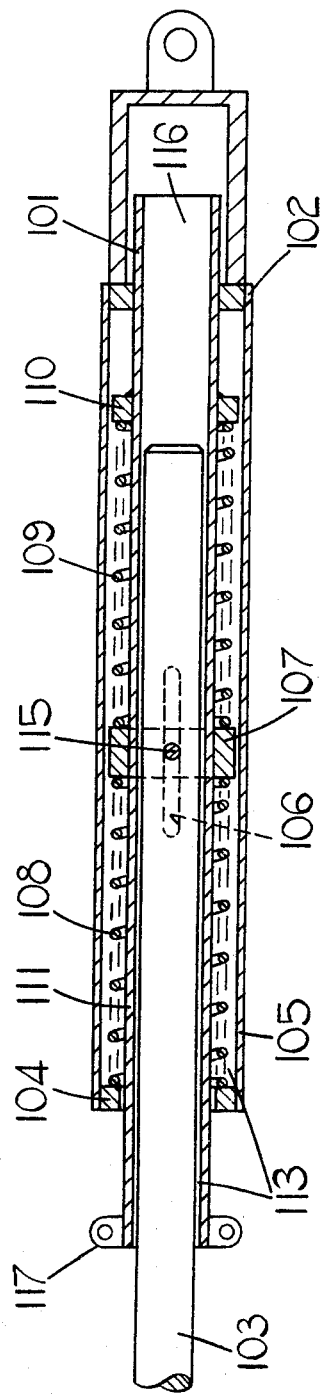

Embodiments of the present invention will now be described, by way of example, with reference to the accompanying drawings in which:

FIG. 1 is a longitudinal sectional view of one form of movement attenuator according to the present invention, and FIG. 2 is a longitudinal sectional view of another form of movement attenuator according to the present invention.

Referring to FIG. 1 of the drawings, the movement attenuator comprises a body 1 which houses adjacent ends of an input element 2 and an output element 3 extending from the body 1 in opposite directions. The input element 2 is of tubular form and has an abutment flange 4 fixed to one end 5 thereof through which end 5 the output element 3 extends. The input element 2 and output element 3 are slidable relative to each other and to the body 1. A pair of opposed slots 6 are provided in the wall of the tubular input element 2 at an intermediate portion thereof spaced from the end 5. A pair of abutment flanges 7 are fixed to the output elements 3 adjacent the end thereof which is disposed within the input element 2, said flanges 7 extending respectively through the slots 6. A first compression spring 8 is disposed between flanges 4 and 7 and engages thereagainst and a second compression spring 9 is disposed between and engages flange 7 and a fixed part 10 defined by an inturned portion of the body 1 at the opposite end thereof to flange 4. The first and second compression springs 8 and 9 act in opposition to each other. The body 1 is formed with a sleeve 11 at one end thereof through which the output element 3 passes with clearance. The end of the sleeve 11 remote from the remainder of the body 1 is sealed by means of a rubber gaiter 12 which engages over the said end of the sleeve 11 and against the output element 3 externally of the sleeve 11. A viscous material 13 is disposed within the sleeve 11 and around the portion of the output element 3 within the sleeve 11. The viscous material is of the type which opposes sudden relative movement between the sleeve 11 and output member 3 but permits slow relative movement therebetween and, in this embodiment, is constituted by a silicone liquid sold by Midland Silicones Limited having a viscosity of 60,000 centistokes plus an additive of Aerosil. A silicone liquid having a viscosity of between 20,000 and 100,000 centistokes may be employed. A groove 14 is provided in the portion of the output element 3 which lies within the sleeve 11 and defines a reservoir for the viscous material 13.

It will be manifest that the position of the output element 3 relative to the input element 2 is determined by the springs 8 and 9. At rest, the output element 3 is disposed so that an equilibrium exists between the two springs 8 and 9 so that, in effect, the output element 3 finds an equilibrium position relative to input element 2. In use, if the input element 2 is moved to the right as viewed in the drawing, the flange 4 is moved to the right so that spring 8 is compressed between flange 4 and flange 7. This upsets the equilibrium between springs 8 and 9 and such equilibrium is re-established by flange 7 moving to the right as viewed in the Figure. This causes the output element 3 in which the flange 7 is attached also to move to the right as viewed in the drawing. In the case where the springs 8 and 9 are of equal size, flange 7 and output element 3 will only move half the distance that input element 2 moved before the equilibrium between springs 8 and 9 is re-established. Thus, in the event of a movement of 1 inch to the right of input element 2, a movement of ½ inch to the right of output element 3 occurs.

Sudden movements of the output element 3 are opposed by the viscous material 13 within sleeve 11 so that only relatively slow movements of the output element 3 occur. In this way, when the attenuator is fitted into a vehicle headlamp levelling system, the vehicle headlamps are not subjected to sudden movement or oscillations as a result of oscillations in springs 8 and 9 or oscillations in input member 2 caused by passage of the vehicle over rough surfaces.

In the case where the flange 4 is spaced from the end of the body 1 opposite fixed part 10, and the input element 2 is moved to the left as viewed in the drawing, the tension on spring 8 is released so that the equilibrium between springs 8 and 9 is again upset and the flange 7 moves to the left as viewed in the drawing to re-establish the equilibrium between springs 8 and 9. Here again, movement of the output element 3 caused by movement of the flange 7 is only half that of input element 2 due to the nature of the connection arrangement involving springs 8 and 9.

Referring now to FIG. 2, the movement attenuator illustrated in FIG. 1 and similar parts are accorded the same reference to which 100 is added. In this embodiment, body 101 to which fixed part 110 is secured is disposed internally of tubular end portion 105 of input element 102. The body 101 and extension 111 thereof contain output element 103 which projects from one end of the extension 111. The output element 103 slides with clearance relative to body 101 and viscous material 113 is disposed in the clearance. Slots 106 in an intermediate portion of body 101 enables communication between the interior of body 101 and the exterior thereof within portion 105. The end portion 105 provides a reservoir for viscous material 113 and houses springs 108 and 109, which are lodged respectively between flanges 104 and 107 and flanges 107 and fixed part 110. Flange 104 is secured to portion 105 whilst flange 107 is attached by a pin 115 to output element 103. An air hole 116 is provided in the end of body 101 remote from extension 111. The body 101 and extension 111 are mounted via a mounting 117 on a fixed part.

The modus operandi of the attenuator of FIG. 2 is the same as that of FIG. 1. Rubber gaiters (not shown) are provided for sealing the ends of body 101 and tubular portion 105 to prevent escape of viscous material 113 in use.

I claim:

1. A device for changing the amount of linear movement in a linkage system, comprising a slidable first element, a slidable second element, a fixed part relative to which said first and second elements are slidable, a first resilient member through which said second element is operably connected to said first element, and a second resilient member disposed between said second element and said fixed part and arranged to act in opposition to said first resilient member so that an equilibrium is established therebetween, one of said elements providing an input and the other of said elements providing an output, whereby when said equilibrium is disturbed by movement of the input element, the output element moves as a result of re-establishment of the equilibrium between the first and second resilient members.

2. A device as claimed in the device according to claim 1, wherein said first element provides the input and said second element provides the output.

3. The device according to claim 1, wherein said first and second elements are co-axially disposed.

4. The device according to claim 1, wherein said fixed part is conveniently formed on a body which houses adjacent ends of said elements.

5. The device according to claim 1, wherein said first element has a tubular end portion into which extends the adjacent portion of said second element, said first element being provided with slot means at an intermediate location and having an abutment projecting laterally from the tubular end portion, said first element having an abutment extending through the slot means, and said first resilient member extending between said two abutments and engaging thereagainst.

6. The device according to claim 1, wherein each said resilient member comprises a compression spring.

7. The device according to claim 1, wherein a damper unit is associated with one of said elements.

8. The device according to claim 7, wherein said second element passes with a clearance through a sleeve and a viscous material is provided in the clearance between said second element and said sleeve, said material being arranged to oppose sudden relative movement between said sleeve and said second element but to permit slow relative movement therebetween.

9. The device according to claim 8, wherein a reservoir for said viscous material is provided internally of the sleeve.

10. The device according to claim 8, wherein said sleeve is formed in said body.

11. The device according to claim 8, wherein said sleeve is formed by part of said body.

* * * * *